United States Patent [19]

Penn

[11] 3,972,391

[45] Aug. 3, 1976

[54] LINING WEAR SENSOR

[75] Inventor: John R. Penn, South Bend, Ind.

[73] Assignee: The Bendix Corporation, South Bend, Ind.

[22] Filed: Mar. 20, 1975

[21] Appl. No.: 560,267

[52] U.S. Cl. .............................................. 188/1 A
[51] Int. Cl.² ........................................ F16D 66/02
[58] Field of Search .................. 116/114 Q; 188/1 A

[56] References Cited
UNITED STATES PATENTS

| 3,141,524 | 7/1964 | Mishler | 188/1 A |
| 3,190,397 | 6/1965 | Sudres | 188/1 A |
| 3,199,631 | 8/1965 | Blankemeyer | 188/1 A |
| 3,495,689 | 2/1970 | Peach | 188/1 A UX |
| 3,675,197 | 7/1972 | Bennett et al. | 188/1 A X |

FOREIGN PATENTS OR APPLICATIONS

| 44-19048 | 11/1963 | Japan | 188/1 A |

Primary Examiner—Duane A. Reger
Attorney, Agent, or Firm—Ken C. Decker; William N. Antonis

[57] ABSTRACT

A worn lining indicator for a disc brake friction pad is disclosed which includes a vibrating reed which is adapted to engage the disc brake rotor upon a predetermined amount of lining wear to thereby produce a relatively loud noise to warn the vehicle operator of the worn condition of the friction pad. The reed is carried by a base portion of the warning device which in turn is attached to an unlined portion of the backing plate of the friction pad. The base portion of the warning device includes a pair of projecting detents that are adapted to gauge corresponding intersecting edges of the projecting portion of the backing plate to thereby orient the reed so that, upon engagement of the latter with the rotor, the reed will be aligned along a radius of the rotor.

7 Claims, 4 Drawing Figures

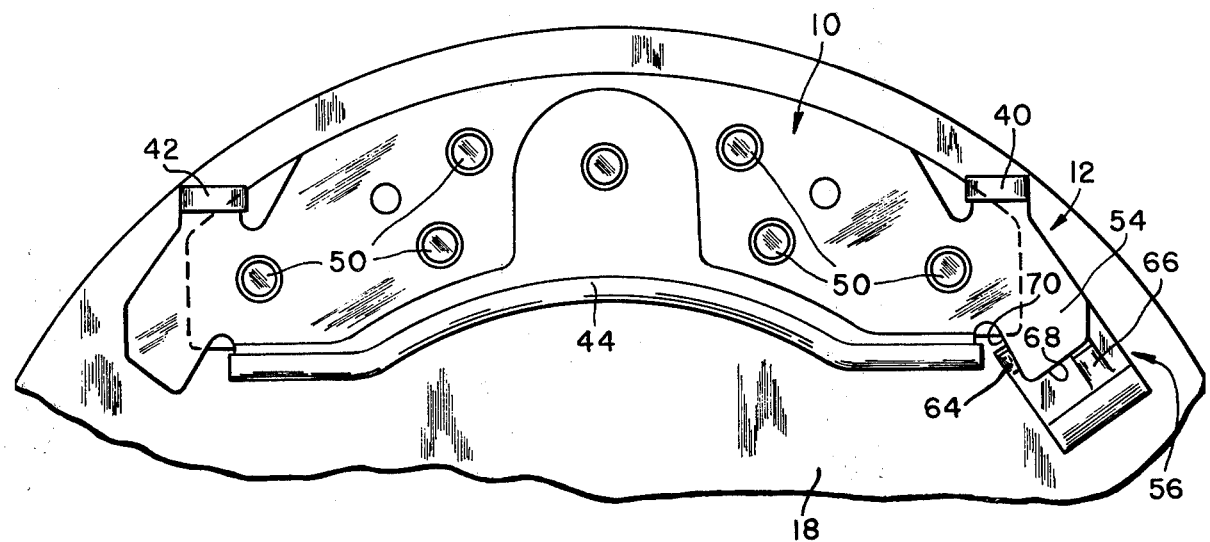
FIG. 1
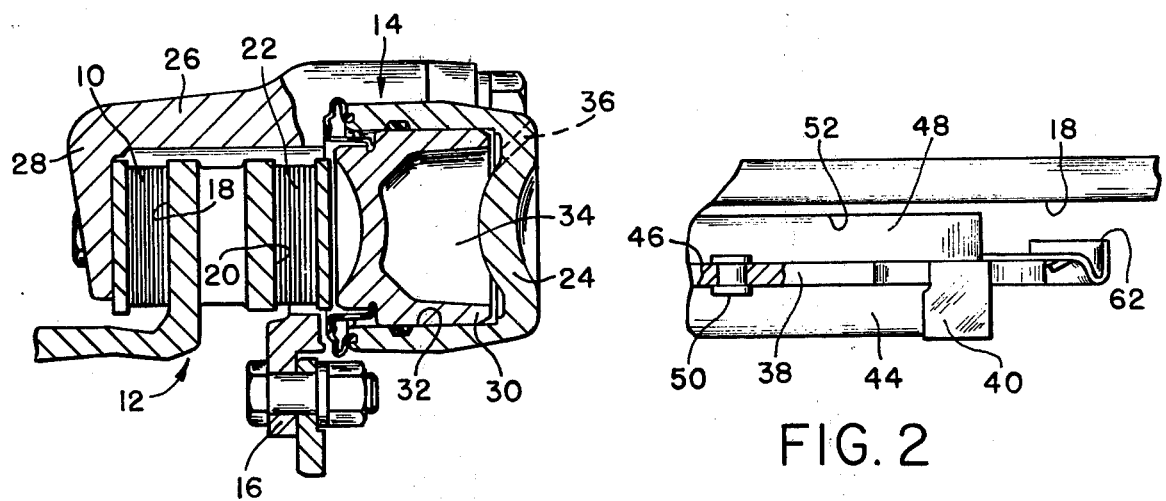
FIG. 3
FIG. 2
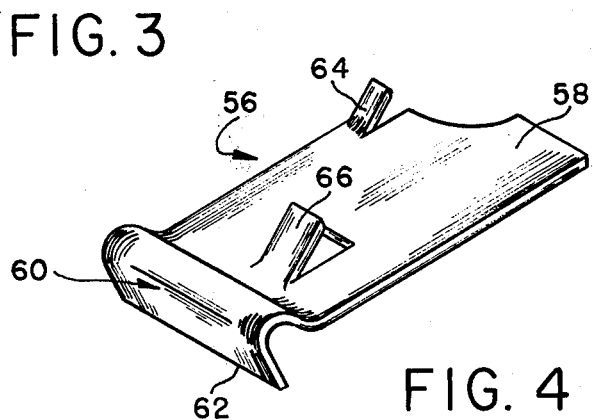
FIG. 4

LINING WEAR SENSOR

BACKGROUND OF THE INVENTION

This invention relates to a worn lining indicator for disc brake friction pads.

Continued operation of a motor vehicle after the friction lining of a disc brake friction pad has worn to a relatively thin level may be quite dangerous in view of the incipient failed condition of the vehicle brakes and may also be quite expensive, since contact of unlined metal with the rotor may severely damage the latter, requiring its replacement. Consequently, it is desirable to provide some sort of visual or audible warning when the friction lining on the disc brake friction pad has worn to a relatively thin thickness. Such a warning device must be relatively simple, both to assure that it may be manufactured at a minimum cost, and also because complicated brake lining wear indicators are subject to failure themselves. However, if the worn lining indicator produces an audible warning, the audible warning must be loud enough and distinctive enough so that the vehicle operator will recognize the warning and be able to distinguish it from the normal brake and road noises. One type of brake lining wear indicator provides a vibrating reed which is carried on a base which is attached to the backing plate of the friction pad. When the lining has worn to a relatively thin level, the vibrating reed engages the friction face of the rotor, which vibrates the reed and thereby causes a relatively loud noise which warns the vehicle operator of the worn condition of the brake linings. However, to assure proper operation of this worn lining indicator, the axis of the reed must engage the friction face of the rotor along a radius of the lining to produce the loudest possible noise. It has been necessary, in attaching the warning device to the backing plate, to use complicated and expensive fixtures to position the warning device in its proper position relative to the backing plate. However, use of such fixtures greatly increases the assembly cost of the friction pad assembly.

SUMMARY OF THE INVENTION

Therefore an important object of my invention is to provide a worn lining indicator for a disc brake which can be quickly and easily placed in its proper position on the backing plate of the friction pad during assembly of the latter.

Another important object of my invention is to provide a worn lining indicator for a disc brake which includes a pair of projections adapted to engage intersecting edges of the portion of the backing plate on which the warning device is attached, so that the warning device is automatically assembled in its proper position relative to the friction pad.

Still another important object of my invention is to simplify the design and assembly of the aforementioned worn lining warning device, to thereby reduce the cost of the completed assembly and to assure its reliability.

DESCRIPTION OF THE DRAWINGS

FIG. 1 is a side elevational view illustrating the relationship between the outboard friction element including a warning device made pursuant to the teachings of my present invention and the rotor of the disc brake;

FIG. 2 is a fragmentary plan view of the assembly illustrated in FIG. 1;

FIG. 3 is a transverse cross-sectional view taken through an assembled disc brake caliper and rotor assembly as it is used in a motor vehicle; and FIG. 4 is a perspective view of the brake lining wear detector illustrated in FIGS. 1 and 2.

DETAILED DESCRIPTION

Referring now to the drawings, a disc brake friction pad generally indicated by the numeral 10 is illustrated in FIGS. 1 and 2 in its operative position relative to a disc brake rotor 12. Of course, the friction element and friction pad 10 would have to be secured to a disc brake caliper, such as the caliper generally indicated by the numeral 14 in FIG. 3, but the friction element 10 and rotor 12 are illustrated in FIGS. 1 and 2 with the caliper removed for clarity. Referring now to the FIG. 3, the caliper 14 is slidably mounted on a fixed supporting member 16 in any suitable manner well known to those skilled in the art, such as in the manner disclosed in U.S. Pat. No. 3,388,774, owned by the assignee of the present invention and incorporated herein by reference. The torque member 16 is, of course, bolted to a stationary or non-rotating portion of the vehicle. The rotor 12 defines a first friction face 18 which is adapted to be engaged by the friction element 10 when a brake application is effected and another opposed friction face 20 which is adapted to be engaged by another friction element 22 when a brake application is effected. The friction element 22 is carried by the fixed support 16 in a manner described in the U.S. patent referred to hereinabove.

The caliper 14 further includes a fluid motor portion 24 which extends substantially parallel to the friction face 20; a bridge portion 26 which traverses the periphery of the rotor 12, and inwardly extending portion 28 which is secured to the friction element 10. A piston 30 is slidably mounted within a bore 32 defined within the housing 24, and the front face of the piston 30 is adapted to engage the friction element 22. The rear face of the piston 30 cooperates with the closed end of bore 24 to define a variable volume fluid chamber 34 therebetween. A passage 36 communicates the chamber 34 with a suitable fluid pressure source, such as the vehicle master cylinder, so that when pressure is developed in the master cylinder upon application of the brake pedal mounted in the vehicle operator's compartment, pressurized fluid is communicated into the chamber 34 whereupon it urges the piston 30 to the left viewing FIG. 3, thereby urging the friction pad 22 into frictional engagement with the friction face 20. Due to the sliding connection between the caliper 14 and the torque member or fixed support 16, reaction forces acting through the bridge portion 26 and the inwardly extending portion 28 of the caliper 14 also thrust the friction element 10 against the friction face 18 of the rotor 12. Due to this frictional engagement of the friction element 10 and 22 and their corresponding friction faces 18, 20, rotation of the rotor 12 is retarded, thereby stopping the vehicle.

The friction element 10 includes a metallic backing plate 38 which is provided with integral flanges 40, 42, and 44 which are used to attach the friction pad 10 to the inwardly extending portion 28 of the caliper 14, in a manner well known to those skilled in the art. The backing plate 38 includes a substantially flat surface 46 which extends parallel to the friction face 18, and a friction lining 48 which may be made pursuant to any standard formulization known to those skilled in the art, is attached to the surface 46 by any suitable device, such as by the rivets 50. The friction lining 48 includes a substantially flat working surface 52, which is adapted to engage the friction face 18 when a brake application is effected.

Although most of the area of the surface 46 of the backing plate 38 is covered by the friction material 48, backing plate 38 includes a projecting portion generally indicated by the numeral 54 which extends from the body of the backing plate 38 in a direction generally parallel to the friction face 18. The projecting portion 54 is not covered by friction material 48, but does carry a worn lining indicating device generally indicated by the numeral 56. The device 56 includes a base portion 58 which mounts a vibrating reed generally indicated by the numeral 60. The reed 60 terminates in a flat edge 62. As is well known to those skilled in the art, repeated engagements of the working surface 52 of the friction material 48 with the friction face 18 of the rotor 12 during a brake application will cause the friction material 48 to wear away. When the friction material wears to such an extent that the heads of the rivets 50 are exposed, the friction face 18 of the rotor 12 may be damaged thereby requiring its replacement. As can be seen most clearly in FIG. 2, base portion 58 of the device 56 is mounted on the projecting portion 54 of the backing plate 38, and the flat edge 62 of the reed 60 is oriented so that it faces the friction face 18 of rotor 12. Consequently, when a sufficient amount of the friction material is worn away, the flat edge 62 will engage the face 18, causing the reed 60 to vibrate, thereby producing noise which is heard by the operator of the vehicle to warn him that his brake linings are in need of replacement. As is obvious to those skilled in the art, it is very desirable to orient the flat edge 62 of the reed 66 such that it engages the friction face 18 along a radius of the rotor, since the force which will be applied to the reed 60 in that case will be maximized, so that the vehicle operator will pay attention to the audible warning signal. In order to assure proper orientation of the edge 62, the base portion 58 is provided with struck-out portions 64, 66 which defines detents projecting from the base 58. As can be seen most clearly in FIG. 1, the projecting portion 54 includes a pair of intersecting edges 68, 70 and the projection 64 engages the edge 70 while the projection 66 engages the edge 68, to thereby properly orient the warning device 56 with respect to the backing plate 38. The base portion may then be welded or riveted to the projecting portion 54. Since the friction pad 10 is mounted on the caliper 14 in a predetermined relationship with respect to the rotor 12, orientation of the warning device 56 with respect to the friction pad 10 assures that the straight edge 62 of the warning device 56 will be oriented along the radius of the rotor 12 upon engagement of the edge 62 with the friction face 18, thereby assuring that the reed 60 will produce the maximum amount of noise to assure a proper warning to the vehicle operator.

I claim:

1. In a friction pad for engagement with a disc brake rotor, said friction pad including a substantially flat backing plate having a pair of corresponding edges and a wearable lining secured to a portion of said backing plate, said lining having a working surface for engagement with said rotor, a worn lining indicator secured to said backing plate, said worn lining indicator including a base and a vibratable reed projecting from said base toward said rotor when the base is secured to the backing plate, said reed terminating short of the initial working surface of the unworn lining so that said reed will engage said rotor upon a predetermined amount of lining wear to give an audible warning signal of the worn condition of said lining, and detent means carried by said base and cooperating with said corresponding edges of said backing plate to orient said reed with respect to the rotor.

2. The invention of claim 1, wherein said reed terminates in a substantially straight edge for engagement with said rotor, and said detent means orients said straight edge along a radius of the rotor.

3. The invention of claim 1, wherein said detent means includes a pair of projections extending from the plane of said base, each of said projections engaging said corresponding edges of said backing plate.

4. The invention of claim 1, wherein said backing plate includes lined and unlined sections, said unlined section including a portion projecting from the lined section of the backing plate in a direction generally parallel to the plane of said rotor and defining said corresponding edges cooperating with said detent means, said detent means including a pair of projections extending from the plane of said base, said projections engaging corresponding edges of said projecting portion of said backing plate.

5. The invention of claim 4, wherein said corresponding edges intersect one of said projections engaging one of said edges, the other projection engaging the other of said edges.

6. The invention of claim 5, wherein said reed terminates in a substantially straight edge for engagement with said rotor, the engagement of said projections with their corresponding edges orienting said straight edges to engage said rotor along a radius of the latter.

7. The invention of claim 1, wherein said backing plate includes lined and unlined sections, said unlined section including a portion projecting from the lined section of said backing plate in a direction generally parallel to the plane of said rotor and defining corresponding edges, said detent means engaging said edges.

* * * * *